May 22, 1956 G. W. LITZ 2,747,117
STUD MOUNTINGS AND BRUSH HOLDER ASSEMBLIES
Filed Aug. 27, 1952 2 Sheets-Sheet 1
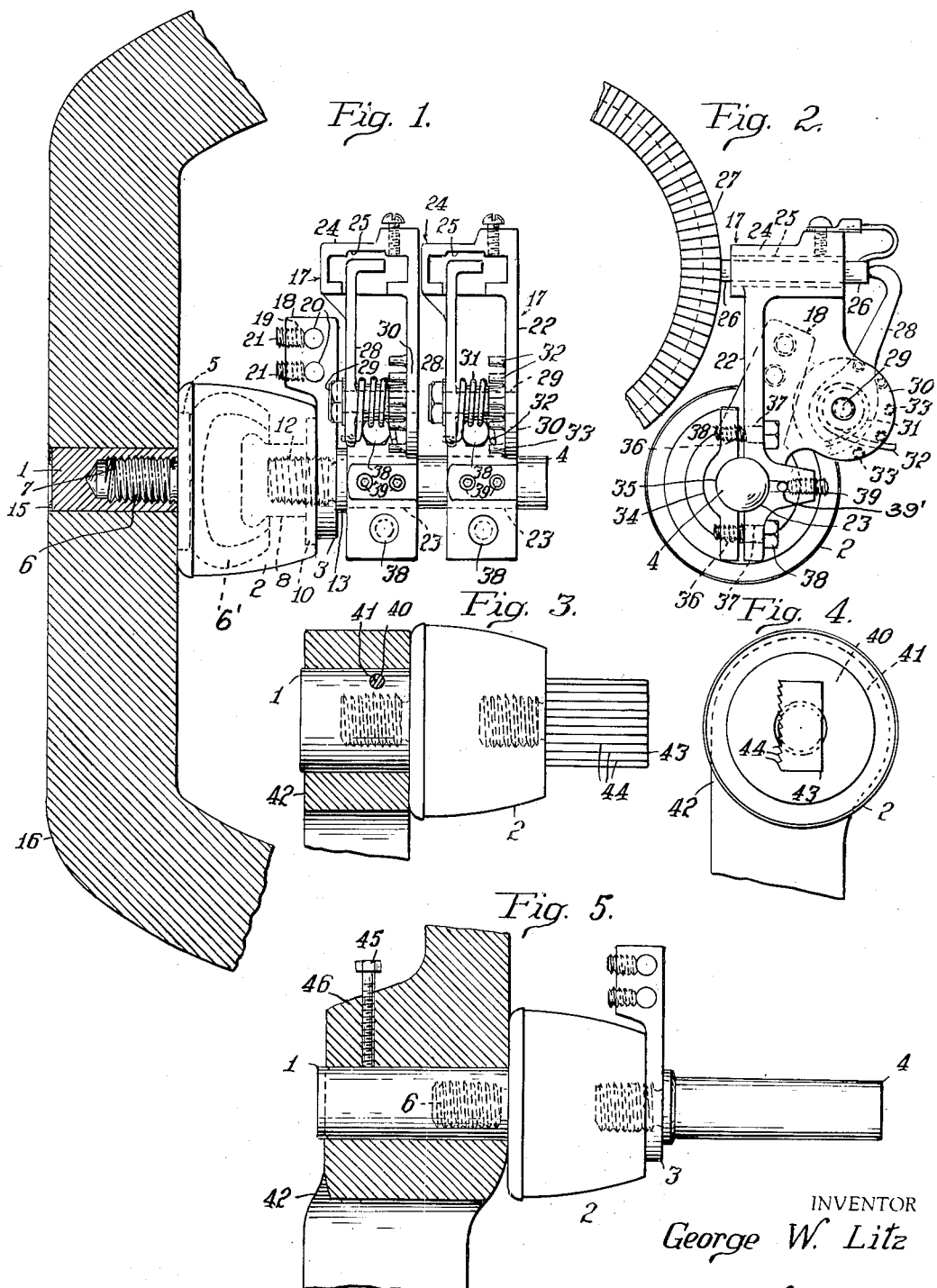
INVENTOR
George W. Litz
BY Cyrus Kehr & [Shoemaker]
ATTORNEYS May 22, 1956 G. W. LITZ 2,747,117
STUD MOUNTINGS AND BRUSH HOLDER ASSEMBLIES
Filed Aug. 27, 1952 2 Sheets-Sheet 2
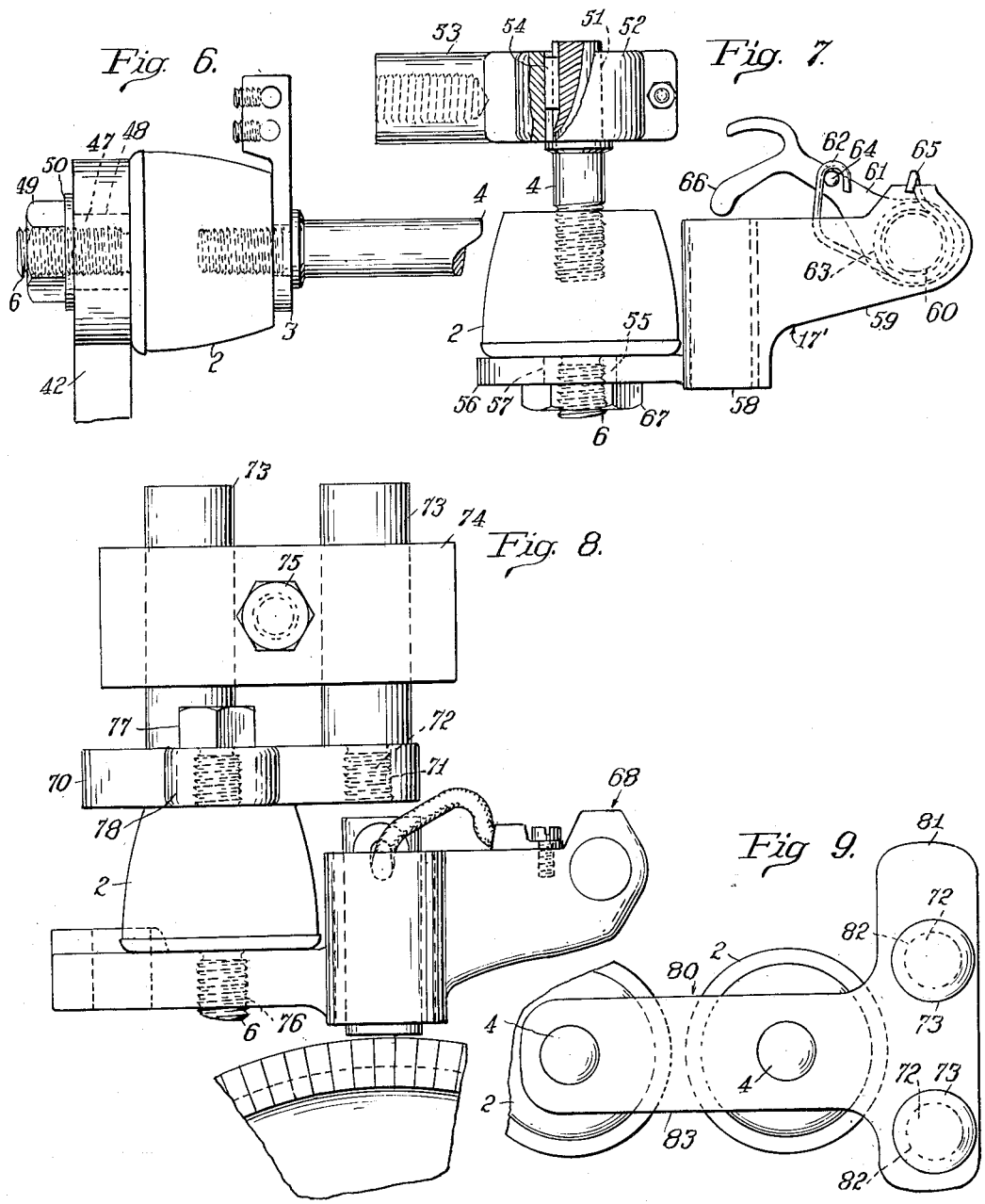
INVENTOR
George W. Litz
BY
ATTORNEY United States Patent Office
2,747,117
Patented May 22, 1956

2,747,117

STUD MOUNTINGS AND BRUSH HOLDER ASSEMBLIES

George W. Litz, Morristown, Tenn.

Application August 27, 1952, Serial No. 306,575

2 Claims. (Cl. 310—239)

This invention relates to improvements in stud mountings and brush holder assemblies, for electric motors and generators, and more specifically to means for supporting the brush holders and the brushes of such devices in their adjusted positions relative to the armature rings or commutators thereof.

One of the primary objects of this invention is to provide a unit comprising a sub-assembly of an electric generator, or motor, for supporting the brush holders thereof on the end bells of their respective frames.

A further object of this invention is to provide a device of the type described and including means for electrically insulating the supporting means from the frame.

A still further object of this invention is to provide a sub-assembly unit for supporting electric motor or generator brush holders which comprises a motor frame adapter, an insulator, an armature lead clamp and a brush holder mounting stud, all of which are threaded together to facilitate the removal and replacement of any one or more of these elements in the event of mechanical or electrical failure thereof.

Additionally, a further object of this invention is to provide a brush holder support which when mounted on the end bell of the frame of an electric unit or on the mounting device thereof will not creep or rotate under vibration or other stresses normally inherent during the operation of the motor.

It is a further object of this invention to provide a unique armature lead connector designed to achieve a wide surface contact area with the brush holder support, while at the same time occupying a minimum space thereon, and yet allowing for the use of an insulator having a greater outer anti-creepage surface.

Another object of this invention contemplates the provision of a new brush holder including means for removably securing the same to the holder support in adjusted position relative to the commutator and in such a manner as to effect the removal therefrom without disturbing the position of other holders.

A still further object of this invention is to provide a sub-assembly unit of the type described and which is inexpensive to manufacture and to maintain.

Another object of this invention is to provide a sub-assembly unit of the type described which may be adapted for use with a variety of types of motors and generators, by providing a proper design for the mounting means for the sub-assembly unit. The number of applications shown in the accompanying drawings illustrates, in general, the adaptability of the sub-assembly unit of this invention, and the same is not to be construed as comprising the only electric motor and generator types in which this invention may be advantageously incorporated.

Persons skilled in the art of electric motors and generators will readily appreciate the merits of this invention when the question arises as to replacement of present-day assemblies in common use by a sub-assembly unit constructed according to this invention.

Other and further objects and advantages of this invention will become manifest from a consideration of the annexed drawings, in which:

Fig. 1 is a side elevation, partly in cross-section, of the accessory unit and the brush holders, assembled and mounted on a commutator end bell, in accordance with the teachings of this invention;

Fig. 2 is an end elevation, partly in cross-section, taken on the line 2—2 of Fig. 1;

Fig. 3 is a side elevation, partly in cross-section, of a modification of this invention, and showing the unit as mounted on a motor or generator frame yoke;

Fig. 4 is an end elevation of the invention of Fig. 3;

Fig. 5 is a side elevation, partly in section, of another embodiment of this invention, wherein the unit is shown as being mounted on a motor or generator frame yoke;

Fig. 6 is a side elevation, partly in section, disclosing another modification of the invention, wherein the brush holder support is mounted on an electric motor or generator frame yoke;

Fig. 7 is a side elevation, partly in section, of a further embodiment of the invention showing the unit secured to the frame bracket;

Fig. 8 is a side elevation of another modification, illustrating the assembly mounted on a frame plate, including an offset plate adapter; and Fig. 9 is a side elevation of another form of an adapter plate designed to accommodate a plurality of assembly units.

Referring now more specifically to Figs. 1 and 2 of the drawings which disclose one embodiment of this invention, the mounting or assembly unit comprises a metallic adapter plug 1, an insulator 2, an armature current clamp 3, and a brush holder shaft or rod 4.

The insulator 2 is preferably molded of suitable insulating material, such as porcelain, ceramic, or the like. As shown in Fig. 1 of the drawings, the insulator 2 has the configuration of a truncated cone and is capable of withstanding severe mechanical strain and stresses without deformation or fracture.

An apertured metal ring 5 is shown as molded in the insulator 2, with a side surface positioned substantially in the plane of the base of the insulator 2.

A metallic threaded stud bolt 6 has one end thereof enlarged in bell-shape as indicated at 6', embedded within the insulator 2, while its other end passes through the aperture formed in the ring 5 and projects beyond the base of the insulator 2, for screw-threaded engagement within an internally threaded bore 7 of the adapter plug 1.

The insulator 2 has molded therein, adjacent its other end, a metallic cap 8, internally threaded, and a second apertured ring 10, coaxially aligned with the cap 8. The ring 10 is positioned substantially in the plane of the adjacent end of the insulator 2, in this embodiment.

The brush holder supporting rod 4 is elongated and is threaded at one end 12, and is provided with a flange 13, adjacent the threaded end 12.

One end of the current clamp 3 is apertured and is sleeved over the threaded end 12 of the brush holder rod 4. Thereafter, the threaded end 12 of the brush holder rod 4 is threaded into the internally threaded cap 8 and tightened therein to secure the armature current clamp 3 between the ring 10 and the flange 13 on the rod 4.

This comprises the assembly unit which is used to support the brush holder. In assembling this unit, it is of prime importance that all of the threaded elements be tightened together the maximum amount permissible to ensure against a loosening thereof when the unit is placed in service.

The use of right or left hand threading depending on the direction of the rotation of the rotor, and utilizing the force generated thereby, increases further the tightening effect on the sub-assembly, and further ensures against the loosening thereof.

To assemble this unit with an electric motor or generator, the outside diameter of the adapter plug 1 is made slightly greater than the inside diameter of the transverse aperture 15 formed in the end bell of the motor frame 16. The adapter plug, with the elements associated therewith, is then force-fitted within the aperture 15. Thereafter, one or more brush holders 17 may be mounted on the brush holder supporting rod 4.

Depending upon the type of electric motor or generator with which the above-described unit is to be used, the armature current clamp 3 may be optionally included as an element of the assembly.

In order to preserve space and to obtain a maximum area contact with the brush holder supporting rod 4, the armature current clamp 3 is formed with a laterally projecting boss 18 at the other end thereof, which is disposed in overlapping relation with respect to the adjacent end of the insulator 2. A pair of spaced aligned threaded passages 19 are formed in the boss 18 and extend substantially parallel to the longitudinal axis of the rod 4 and communicate at their inner ends with a pair of passages 20, extending substantially perpendicular thereto. The passages 20 are adapted to receive the ends of leads (not shown) of an electric cable, and the leads are detachably secured within the passages 20 by means of set screws 21.

Again referring to Figs. 1 and 2 of the drawings, each of the brush holders 17 is identical in construction and the following description of one brush holder is equally pertinent with respect to the other. As seen in these figures the brush holder 17 comprises an elongated stem 22 having a semi-circular recess 23 formed therein adjacent one of its ends. The other end of the stem 22 is integral with an enlarged boss 24 having a transverse recess 25 formed therein substantially rectangular in cross-section to receive therein a carbon brush 26. As is clearly seen in Fig. 2, one end of the carbon brush 26 is forced into engagement with a commutator 27 by a lever arm 28, which bears against the other end of the brush 26. The arm 28 is rotatably mounted on a pin 29 projecting laterally from a side wall 30 of the brush holder stem 22, and has the lower end thereof connected to one end of a helical spring 31 which surrounds the pin 29. The other end 32 of the spring 31 is adjustably secured between radially spaced pins 33 (see Fig. 2).

An elongated clamp plate 34, having an elongated substantially semi-circular recess 35 formed therein, is provided and is adapted to cooperate with the recessed end of the stem 22 to clamp the brush holder on the supporting rod 4. To this end, the clamp 34 is provided with a pair of spaced aligned threaded apertures 36 on each side of the semi-circular recess 35, which are aligned with the apertures 37 formed in the brush holder 17, and the two members are then secured together by means of a plurality of threaded stud bolts 38.

In the event it is not desired to use the armature current clamp 3, the same may be omitted and connection of the ends of the lead wires may be made directly with the brush holders 17. This may be accomplished by threading set screws 39 into passages formed in the lower end of each of the brush holders 17, the set screws 39 being designed to engage against leads positioned in the transverse passages 39'. Such construction eliminates the necessity for the current to pass from the brush holders 17 through the stud 4 and the current clamp 3, and simultaneously results in the conservation of space.

The sub-assembly shown in Figs. 3 and 4 is similar in most respects to that embodiment of the invention illustrated in Figs. 1 and 2. However, in the latter embodiment, the adapter plug 1 is provided with an aperture 40 to receive a set screw 41, which extends through a portion (not shown) of a motor frame yoke 42 on which the unit is shown as being mounted. The set screw 41 serves as additional insurance against the rotation of the adapter plug 1 relative to the frame yoke 42.

This modification of the invention differs in still another respect, and reference is made to the brush holder supporting rod 43. As shown in Figs. 3 and 4, the brush holder supporting rod 43 is substantially rectangular in cross-section and is designed to accommodate brush holders 17, the lower ends of which are provided with a substantially rectangular configuration, and the cooperating mounting clamp therefor is provided with inner ratchet teeth adapted to engage with the ratchet teeth 44 formed on one side of the brush holder supporting rod 43.

Fig. 5 illustrates another modification of the invention wherein the unit disclosed in Figs. 1 and 2 is shown as being mounted on a motor frame yoke 42. In this instance, however, a set screw 45 is threaded into an enlarged boss 46 of the frame yoke 42 and bears against the adapter plug 1 in order to prevent rotation thereof relative to the frame yoke 42.

Fig. 6 shows another embodiment of the invention wherein a threaded metallic sleeve 47 is pressed into an aperture 48 formed in a motor frame yoke 42, and the stud bolt 6 of the insulator 2 is elongated to pass entirely through the threaded sleeve 48 in order to receive a lock nut 49 and washer 50. In all other respects the unit is identical to that disclosed in Figs. 1 and 2.

In the embodiment of the invention shown in Fig. 7, the rod 4 projecting from the insulator 2 is press-fitted within an aperture 51 formed in an enlarged boss 52, on a frame mounting bracket 53. To ensure against relative rotation of the rod 4 with respect to the bracket 53, the rod 4 is keyed at 54 to the bracket. A collar 55 is threaded on the stud bolt 6.

The brush holder 17' is provided with a lateral flange 56 apertured at 57 and fitted over the collar 55. The brush holder 17' is provided with a boss 58 having a substantially hollow rectangular configuration in cross-section to receive therein a carbon brush (not shown). The other end of the brush holder 17' comprises a lateral extension 59 on which is supported a pivot pin 60 for a lever arm 61. One end 62 of a helical spring 63 is hooked about a pin 64 projecting laterally from the lever arm 61, while the other end 65 of the spring 63, after being coiled around the pin 60, is anchored in any suitable manner on the extension 59. The tension of the spring 63 constantly tends to urge the free end 66 of the lever arm 61 into engagement with one end of the carbon brush.

To provide additional means for insuring against inadvertent rotation of the brush holder 17', a lock nut 67 is threaded on the stud bolt 6 and engages against the flange 56.

Fig. 8 discloses a still further embodiment of this invention. In this embodiment means are provided for mounting a brush holder 68 from an offset plate 70. The offset plate 70 is provided with a pair of spaced threaded apertures 71 adjacent an edge thereof, adapted to receive therein the reduced threaded ends 72 of the rods 73 which are clamped to the motor frame (not shown) beneath a clamp plate 74 held under compression by means of a stud bolt 75.

A stud bolt 6 of the insulator 2 is threaded in an aperture 76 formed in the brush holder 68, and the threaded cap 8 of the insulator 2 receives a cap screw 77 which clamps a threaded adapter collar 78 thereto.

In Fig. 9 a modified offset plate mounting is illustrated. In this embodiment the plate is designated, in general, by the reference numeral 80 and has a substantially T-shaped configuration. The head 81 of the plate 80 is provided with a pair of spaced aligned apertures 82 adapted to receive therein the reduced end portions 72 of a pair of bolts 73, as shown in Fig. 8, for connection with the motor or generator frame.

The stem 83 is formed with a pair of apertures to receive, by press-fitting, the ends of rods 4 of an assembly of the type shown, for example, in Fig. 7.

From a reading of the above specification, it is deemed manifest that the recited objects of this invention are easily obtainable by virtue of the unique construction of the sub-assembly unit and of the brush holder. The adjustment of the brushes radially with respect to the commutator or armature ring is easily achieved through the loosening of the brackets, and the design of the brush holders is such that in the event of a mechanical failure thereof, the same may be easily removed and replaced.

From the foregoing it is manifest that the assemblies for supporting brush holders may be easily mounted for adjustment and mechanically secured in the desired position in any of the conventional types of electric motors or generators. The assembly is composed of a plurality of parts which are mechanically interlocked and adjustably positioned with respect to each other. The elements of the assembly are individually removable for replacement, as the circumstances may warrant. The assembly is of such design that the user thereof may assemble the same in any electric motor or generator without redesigning the motor mounting therefor provided in the frame, thereby assuring the user of advantages which are not obtainable in conventional brush holder studs or assemblies.

Space has always been a major factor in the design of electric motors and generators. In the instant case, space conservation is obtained by the use of a specially designed armature current clamp wherein the enlarged boss serving as the lead connector substantially overlies the insulator, and each of the brush holders is provided with an offset portion to overlie an adjacent armature current clamp.

The sub-assembly is non-complex in construction as are the brush holders. This results in inexpensive manufacturing costs, and, of course, low maintenance.

It will be understood that the several embodiments disclosed and illustrated herein have been offered by way of example and that the invention is to be limited only by the scope of the following claims.

I claim:

1. An assembly unit for supporting a plurality of brush holders on the frame of an electric motor, said unit comprising an insulator having a pair of opposed sides, a threaded bolt extending from one side of said insulator, an elongated substantially cylindrical adapter plug having a coaxially aligned threaded opening formed therein, said adapter plug being threaded onto said bolt, said insulator having an internally formed threaded recess extending inwardly from the other side thereof, an elongated substantially cylindrical brush holder supporting rod having a threaded end and a radially extending flange formed intermediate the ends thereof, an elongated armature current clamp having an aperture formed therein adjacent one of its ends to receive said threaded end portion of said rod therethrough, said rod having its threaded end mounted within said recess formed in said insulator to clamp said armature current clamp between the said insulator and said flange, and said rod having a portion thereof extending between said flange and the other end of said rod for mounting a plurality of brush holders thereon.

2. An assembly unit for supporting a brush holder on the frame of an electric machine, said unit comprising an insulator having a pair of opposed ends, means attached to one end of said insulator for connecting the insulator to said frame, a metal ring and a coaxial threaded socket embedded in the opposite end of said insulator with said ring exposed on the end face of the insulator, a metal brush holder support rod threadedly secured in said socket and extending through said ring in contact with the wall of the opening therein and having a shoulder thereon spaced from said ring, and an angularly adjustable armature current clamp clamped in position on said rod between said shoulder and said ring, said clamp comprising an elongated shank having an aperture formed therein to receive therethrough said brush holder supporting rod, said shank having an enlarged boss formed thereon and projecting laterally away therefrom, a pair of spaced parallel passages extending transversely through said boss and adapted to receive the ends of leads connecting said clamp with an electric circuit, a second pair of spaced parallel passages formed in said boss, said last-named pair of passages being threaded and communicating at their inner ends with said first-named passages, and a set screw for each of said last-named passages for detachably securing the adjacent ends of said leads within said first-named passages.

References Cited in the file of this patent

UNITED STATES PATENTS

| | | |
|---|---|---|
| 902,424 | Loring | Oct. 27, 1908 |
| 930,007 | Webster | Aug. 3, 1909 |
| 1,287,812 | Ahlm | Dec. 17, 1918 |
| 2,426,815 | Burrus | Sept. 2, 1947 |
| 2,615,954 | Mungovan | Oct. 28, 1952 |

FOREIGN PATENTS

| | | |
|---|---|---|
| 15,686 | Great Britain | of 1901 |
| 335,435 | Germany | Apr. 2, 1927 |
| 373,159 | Great Britain | May 17, 1932 |
| 503,211 | Germany | July 29, 1930 |